United States Patent Office 3,431,488
Patented Mar. 4, 1969

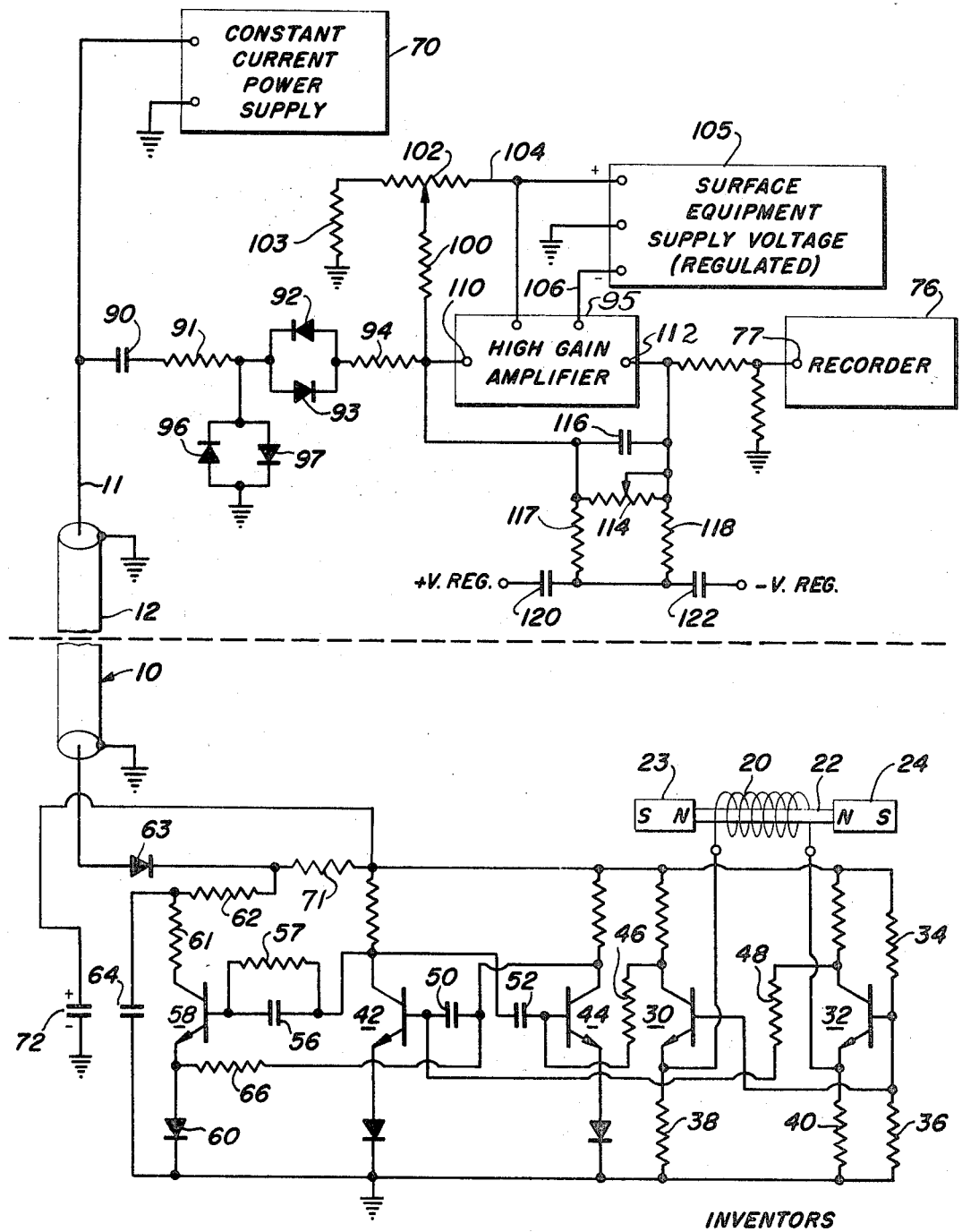

3,431,488
STABILIZED HIGH TEMPERATURE CASING COLLAR LOGGING SYSTEM UTILIZING THE ON-OFF RATIO OF A SQUARE WAVE AS A SIGNAL TRANSMITTING MEANS
Homer M. Wilson and Leroy C. De La Torre, Houston, Tex., assignors, by mesne assignments, to Dresser Industries, Inc., Dallas, Tex., a corporation of Delaware
Filed Apr. 19, 1965, Ser. No. 448,948
U.S. Cl. 324—34     16 Claims
Int. Cl. G01r 33/00; G01v 3/00, 1/40

ABSTRACT OF THE DISCLOSURE

The casing collar logging system is provided with single collar locator coil which is connected between the differential inputs of a transistor differential amplifier in the subsurface unit and a free-running multivibrator is conductively connected to the differential outputs of the differential amplifier and develops a pair of square wave output signals which are supplied to an output switching transistor which connects an auxiliary load circuit across the bottom end of the cable. A constant current power supply at the earth's surface is employed to produce corresponding voltage impulses at the surface end of the cable corresponding to periods when the switching transistor is conducting. This voltage signal is selectively amplified in a high gain feedback amplifier and provision is made for preventing overload of the amplifier when the equipment is turned on.

---

The present invention relates to well logging systems, and, more particularly, to well logging systems wherein facilities are provided for logging or otherwise indicating the presence of so-called collars or joints along the casing in a cased bore hole.

In the past various arrangements have been proposed for logging casing collars. Usually, this collar logging operation is carried out in conjunction with another type of well logging system, which may be an acoustic logging system or a radiation logging system, and the positions of the casing collars are used as depth measurements to correlate the associated log or logs with available geologic information. These arrangements, while generally satisfactory, have required a considerable amount of power, have been relatively insensitive in detecting the presence of casing collars and have been susceptible to extraneous noise voltages and other undesired signals. Many of these systems have required a separate power supply in the subsurface unit. Furthermore, these systems have not been capable of operating satisfactorily at the extremely high temperatures encountered in some well logging operations.

It is a primary object of the present invention to provide a new and improved casing collar logging system wherein one or more of the above-discussed disadvantages of the prior art is eliminated.

It is another object of the present invention to provide a new and improved casing collar logging system in which a high degree of sensitivity to the presence of casing collars is provided while at the same time providing a casing collar indication which is free from noise voltages and other undesired signals.

It is a further object of the present invention to provide a new and improved casing collar logging system which is very insensitive to noise voltages and other low-level signals which may be picked up on the logging cable.

It is a still further object of the present invention to provide a new and improved casing collar logging systems which may be energized directly from the earth's surface and without requiring an independent power supply in the subsurface unit.

It is another object of the present invention to provide a new and improved casing collar logging system wherein a very small amount of power is required to energize the circuitry in the subsurface unit.

It is still another object of the present invention to provide a new and improved casing collar logging system in which transistors are employed in the subsurface unit and facilities are provided for stabilizing the operation of said transistors so that an accurate casing collar signal is provided at high well temperatures in the order of 200° centigrade.

Briefly, in accordance with one aspect of the invention, a single collar locator coil is connected between the differential inputs of a transistor differential amplifier in the subsurface unit. A free running multivibrator is provided in this unit which develops a square wave output signal of predetermined periodicity and is controlled by the differential output of the differential amplifier in such manner that the ratio of the on-off periods of this square wave output signal varies in accordance with the voltage induced in the collar locating coil without substantially changing the periodicity of the square wave output signal. The multivibrator output signal is then filtered to provide a low-frequency collar locating signal, of relatively high level as compared to the induced voltage, which is transmitted to the earth's surface.

In accordance with a further aspect of the invention, the collar locating signal is passed through a noise clipping circuit at the earth's surface to remove all low level noise components and hash which may have been picked up on the cable. The resultant signal is then selectively amplified in a high gain amplifier which is stabilized by resistive feedback and has accentuated amplification in the frequency range of the casing collar signal. A unique circuit arrangement is provided in conjunction with this feedback amplifier for preventing over-loading of the amplifier when the equipment is turned on so that a clear, sharp, and accurate indication of the position of casing collars is immediately provided.

The invention, both as to its organization and method of operation, together with further objects and advantages thereof, will best be understood by reference to the following specification taken in connection with the accompanying drawings in which:

The single figure of the drawing is a schematic diagram of a casing collar logging system embodying the principles of the present invention.

Referring now to the drawing, the casing collar logging system of the present invention is therein illustrated as including a supporting cable 10 having a center conductor 11 and a conductive grounded outer sheath 12, subsurface equipment indicated below the horizontal dotted line in the drawing and contained in a suitable housing connected to the lower end of the cable 10, and surface equipment connected to the upper end of the cable and shown above this horizontal line. Another conductor may be substituted for the sheath 12 if a multiconductor cable is used.

Considering first the subsurface equipment, the presence or absence of casing collars is detected by means of casing collar locator coil 20 which is wound about a core 22 of magnetic material positioned between a pair of permanent magnets 23 and 24 which are polarized in the manner indicated in the drawing. The coil 20 may, for example, consist of a relatively large number of turns of relatively fine wire wound on the core 22. Preferably, the locator coil 20 and its associated magnetic structure is positioned in the top portion of the subsurface unit and above any associated well logging apparatus which may also be contained within the subsurface housing.

As the subsurface unit moves past a casing collar in a cased bore hole, the magnetic field set up by the permanent magnets 23 and 24 is distorted and a voltage is induced in the coil 20. At ordinary logging speeds, the collar locating voltage developed across the coil 20 will consist of a relatively low frequency fluctuation having a first portion of one polarity followed by a second portion of the opposite polarity, the total duration of this signal being in the order of from one-half to one second.

The collar locator coil 20 is connected to the emitters of a pair of transistors 30 and 32 which form a differential amplifier. The bases of the transistors 30 and 32 are biased by means of the voltage divider network 34, 36 and the emitter of the transistor 30 is connected through a resistor 38 to ground and the emitter of the transistor 32 is connected through a resistor 40 to ground.

The differential output signal developed at the collectors of the transistors 30 and 32 is coupled to a multivibrator comprising a pair of transistors 42 and 44 which are interconnected to provide a multivibrator circuit in which the total time period of the multivibrator remains substantially constant, but the on-off time or symmetry of the multivibrator output varies with the collar locator signal voltage developed across the coil 20. To this end, the collector of the transistor 30 is coupled through a time constant resistor 46 to the base of the transistor 44 and the collector of the transistor 32 is connected through a time constant resistor 48, of similar resistance value, to the base of the transistor 42. Time constant determining capacitors 50 and 52 are provided between the collector and base of the transistors 42 and 44. With this arrangement, the differential voltage developed between the collectors of the transistors 30 and 32, which varies in accordance with the collar locator signal, influences the conduction time of the multivibrator 42, 44 in a push-pull manner so that the on-off periods of the multivibrator output waveform vary in accordance with the collar locator signal. Thus, assuming that no collar voltage is produced across the coil 20, the output of the multivibrator 42, 44 will have a predetermined ratio of on-to-off periods. However, during the positive portion of the collar locator signal the duration of the first half-cycle of the multivibrator square wave will be correspondingly decreased, for example, and the duration of the last half cycle correspondingly increased. Likewise, during negative portions of the collar locating voltage, the duration of the first half of the multivibrator square wave will be correspondingly increased and the duration of the last half-cycle correspondingly decreased in proportion to the amplitude of the collar locating voltage.

The variable duration square wave thus produced at the collector of the transistor 42 is supplied through a parallel connected capacitor 56 and resistor 57 to the base of an output switching transistor 58, the emitter of this transistor being connected through a diode 60 to ground, i.e., the minus conductor in the subsurface unit. The collector of the transistor 58 is connected through a pair of series connected resistors 61 and 62 and through a protective diode 63 to the center conductor 11 of the cable 10. The output switching transistor 58 is thus turned on for a period of time proportional to the duration of one polarity of the square wave output signal developed by the multivibrator 42, 44, this time duration being proportional to the amplitude and polarity of the casing collar voltage developed across the coil 20.

A capacitor 64 is connected from the junction of the resistors 61 and 62 to the return sheath or ground of the cable 10 and functions with the resistors 61 and 62 to filter out the square wave signal components produced by the multivibrator 42, 44 so that the collar locating signal applied to the cable 10 consists of only the low frequency components of the original voltage induced in the coil 20. The capacitor 64 and resistors 61 and 62 thus function to produce a signal proportional to the area of one-half cycle of the square wave signal and since the periodicity or recurrence rate of the overall square wave signal is maintained substantially constant, the produced signal is linearly related to the induced voltage originally developed across the coil 20. At conventional logging speeds, the casing collar signal so developed has a frequency of approximately one-half to one cycle per second.

In order to provide a balanced load on the multivibrator 42, 44, the voltage appearing at the collector of the transistor 44 is also supplied through a resistor 66 to the emitter of the switching transistor 58 so that the base and emitter of this transistor are driven out of phase. Such an arrangement provides a balanced load on the multivibrator 42, 44 and hence facilitates maintaining the total period of this multivibrator constant with temperature changes. Also, current flowing through the resistor 66 provides forward biasing current for the diode 60.

The above-described arrangement in the subsurface unit has the particular advantage that all of the transistors which are called upon to carry high level signals are used merely as switching devices which are either on or off and are not required to transmit an absolute level of signal. Thus, the switching transistors 42 and 44 of which form the above-described multivibrator are used merely as on-off devices, as well as the output switching transistor 58. In this connection, it will be noted that the differential amplifier 30, 32 amplifies only a very low level signal. Accordingly, when the subsurface unit is subjected to operating temperature of 200° centigrade, the output signal of the casing collar circuitry still accurately and faithfully corresponds to the voltage induced in the coil 20. Furthermore, the operation of the high current transistors in this circuitry as either fully conductive or non-conductive means that the transistors dissipate little power, since when these transistors are heavily conducting there is very little voltage across them, and when there is a relatively large voltage applied to them very little current is flowing. On the other hand, if these transistors were operated Class A, the power dissipated by them would be excessive and high temperature operation to 200° centigrade would not be possible while maintaining the same accuracy and stability.

In considering the manner in which the casing collar signal is impressed upon the cable 10, it will be seen that when the switching transistor 58 is rendered fully conductive, the additional load consisting of the resistors 61 and 62 is placed directly across the cable 10. As will be described in more detail hereinafter, the surface equipment is effective to supply a constant value of current to the upper end of the cable 10. Accordingly, when the additional load of the resistors 61 and 62 is placed across the bottom end of the cable, the voltage between the conductor 11 and sheath 12 decreases. This is because the total impedance of the load connected to the cable is decreased but the current remains constant so that the voltage across the load at the bottom end of the cable 10 must decrease. Accordingly, a collar-locating signal of relatively small amplitude is superimposed on the 30-volt potential which is normally present between the conductor 11 and sheath 12, and is transmitted to the earth's surface for detection.

Considering now the equipment provided at the earth's surface, a constant current power supply indicated generally at 70 is provided. The output voltage of this supply may vary in accordance with the current drain in the subsurface unit, as described previously, and output of this supply is connected to the center conductor 11 of the cable 10 and to ground so that a voltage of suitable magnitude is supplied to the subsurface unit. The output transistor 58 is decoupled from the multivibrator 42, 44 and amplifier 30, 32 by a decoupling network including a series resistor 71 and a shunt capacitor 72 to stabilize operation of these units.

In the event that the power supply 70 is connected to the upper end of the cable 10 in the wrong polarity, the rectifier 63 in the subsurface unit will be biased against conduction and hence will prevent the application of voltage of the wrong polarity to the transistors in the subsurface unit and the consequent damage to this equipment.

A recorder 76 is provided at the earth's surface which may comprise any suitable arrangement for producing the collar position indicating signal in response to a signal applied to the input terminal 77 thereof. As stated heretofore, the casing collar logging system of the present invention is, in most instances, employed in conjunction with another type of well logging system such as acoustic or radiation, which may comprise one or more logging channels adapted to produce corresponding logs of the subsurface formations traversed by the subsurface unit. In such case, the recorder 76 will customarily be arranged to produce the associated logs on the same chart with the collar position indications to permit these collar position indications to serve as depth measurements for correlation of the other logs, as will be readily understood by those skilled in the art. Also, the cable 10 may, if desired, be employed to transmit a suitable electrical logging signal or signals, from the subsurface unit to the earth's surface, in which case a series resistor (not shown) is connected between the cable conductor 11 and the supply 70 to permit detection of this electrical signal and suitable adaptation thereof to provide the desired log, or logs, as will also be readily understood by those skilled in the art.

Considering now the circuit arrangement provided at at the earth's surface for receiving the casing collar signal developed in the subsurface unit, the voltage appearing on the conductor 11 is supplied through a capacitor 90 and a resistor 91, through a pair of parallel-connected, reversely-polarized diodes 92 and 93 and through a resistor 94 to the input of a high gain amplifier 95. The left-hand side of the diodes 92, 93 is also connected to ground through a pair of parallel-connected, reversely-polarized diodes 96, 97. The input to the amplifier 95 is also connected through a resistor 100 to the arm of a potentiometer 102 connected in series with a resistor 103 from the plus conductor 104 of a regulated voltage supply 105 which is also arranged to provide a negative regulated voltage on the conductor 106, both positive and negative voltages being applied to the amplifier 95 for energization thereof.

The high gain amplifier 95 preferably comprises a plurality of high gain direct coupled amplifier stages wherein the casing collar signal, which is modified in the manner described in more detail hereinafter and is applied to the input terminal 110 thereof, is amplified and appears at the output terminal 112. In order to provide stability for the stages of the amplifier 95 a feedback circuit is provided between the output terminal 112 and the input terminal 110 of this amplifier. This feedback circuit provides a high degree of resistive feedback but is arranged to provide a smaller amount of feedback for frequencies in the range of the casing collar signal so that this signal will be selectively amplified in the stages of the amplifier 95. More particularly, a potentiometer 114 is connected between the output terminal 112 and the input terminal 110 of the amplifier 95, a capacitor 116 being connected across the potentiometer 114 so as to provide stabilization against high frequency fluctuations in the input. A pair of resistors 117 and 118 are connected across the potentiometer 114 and a first capacitor 120 is connected from a regulated plus terminal (which may be the conductor 104) to the junction of the resistors 117 and 118. A second capacitor 122 is connected from a negative potential point (which may be the conductor 106) to the junction of the resistors 117 and 118.

It is pointed out that the potentiometer 114 provides negative feedback for direct current and hence stabilizes the stages of the amplifier 95. However, the capacitors 120 and 122, together with the resistors 117 and 118, comprise a shunt filter network which decreases the negative feedback provided at low frequencies in the frequency range of the casing collar signal. The capacitors 120 and 122, which preferably each have a capacitance value of 100 microfarads, function to shunt to ground some of the low frequency alternating current components of the feedback signal so that the high gain amplifier 95 has somewhat more gain for low frequency alternating current signals than for direct current. By adjustment of the potentiometer 114, the gain of the amplifier 95 may be adjusted to conform to the input requirements of the recorder 76. The potentiometer 102 may also be adjusted to provide a zero voltage output at the terminal 112 in the absence of a casing collar signal.

The provision of the oppositely-polarized diodes 92 and 93 has the advantage of eliminating low level noise and other extraneous signals on the conductor 11 which will be of insufficient amplitude to cause conduction of either of the diodes 92 or 93. These diodes preferably have a conduction potential of approximately 0.25 volt. Accordingly, no input signals are transmitted to the input of the amplifier 95 which are less than plus or minus 0.25 volt in amplitude. Such an arrangement has the advantage that the recording pen of the recorder 76 is not deflected by any low-level noise signals and produces sharp, well-defined spikes only in response to each casing collar signal which is detected. In this connection, it will be understood that a suitable, center-scale-zero meter may be connected to the output of the amplifier 95, either in addition to or in place of the recorder 76, to provide a visual indication of the traversal of casing collars by the subsurface unit.

The reverse-connected clamping diodes 96 and 97 preferably have a conduction potential of about 1.5 volts and function to prevent the input to the amplifier 95 from rising more than plus 1.5 volts or falling more than minus 1.5 volts. With this arrangement, overloading of the input circuit of the high gain amplifier 95 by large amplitude signals, is prevented. Furthermore, the clamping action of these diodes provides a fast recovery for the coupling capacitor 90 which must have a relatively large capacitance value, in the order of two microfarads, in order to pass the relatively low frequency casing collar signals. By providing these clamping diodes, the capacitor 90 is permitted to recover quickly from large amplitude overload signals and furthermore, the recovery time of the high gain amplifier 95 is considerably facilitated by limiting, by means of these clamping diodes, the maximum voltage which can be applied to the input of this amplifier.

The positive and negative excursions of casing collar signal which is passed to the high gain amplifier 95 have an amplitude somewhat above the clipping level of the diodes 92, 93 but somewhat less than the potential at which the clamping diodes 96, 97 are rendered conductive. Accordingly, this signal, which has a duration of approximately 0.5 to 1.0 second, is selectively amplified in the high gain amplifier 95 since this amplifier is provided with a higher gain for low frequency AC signals than for DC signals. With this feedback arrangement, considerable discrimination is provided against DC amplification through the high gain amplifier and yet good stability for temperature variations is provided. It is also pointed out that by connecting one of the capacitors 120, 122 to a negative potential point and the other capacitor to a positive potential point the midpoint of these capacitors, which are preferably of equal capacitance value, is essentially at ground potential. Accordingly, when the equipment is turned on and voltages are established across the plus and minus regulated voltage conductors 104, 106, the input to the high gain amplifier 95 is not overloaded as it would be if only a single capacitor were connected to either a plus or minus potential point. Since these capacitors are of extremely large value, in the order of one hundred microfarads, they would take a considerable period of time to be charged up, and the high gain amplifier would be disabled during this entire period.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, a differential amplifier in said unit and having a pair of input terminals, means conductively connecting said coil between said pair of input terminals, a multivibrator in said unit and arranged to develop a square wave output signal of predetermined periodicity, means for conductively connecting the output of said differential amplifier to said multivibrator so that the on-off ratio of said square wave output signal varies in accordance with said induced collar locating voltage developed across said coil, means in said unit for impressing a casing collar signal on said cable corresponding to said square wave output signal for transmission to the earth's surface, and means at the earth's surface for detecting said casing collar signal and providing an indication of the traversal of casing collars by said subsurface unit.

2. In a casing collar logging system, the combination of, a subsurface unit, a cable connected to said unit for moving the same through a bore hole, a single collar locator coil in said unit, means for establishing a magnetic field which linkes said coil and is affected by casing collars as said unit is moved through the bore hole, whereby a voltage is induced in said coil each time said unit passes a casing collar, a differential amplifier in said unit including a pair of transistors, means directly connecting the ends of said coil to the emitters of said pair of transistors so that said induced voltage is reproduced in amplified form in the output of said amplifier, a free running multivibrator in said unit arranged to develop a square wave output signal and having a time constant determining circuit which controls the ratio of on-off periods of said square wave output signal, means connecting the output of said amplifier to said time constant determining circuit, thereby to modulate the ratio of on-off periods of said square wave output signal in accordance with said amplified induced voltage, means in said unit for impressing said modulated square wave signal on said cable, and means at the earth's surface for detecting said modulated signal and providing an indication of the traversal of casing collars by said subsurface unit.

3. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, an amplifier in said unit, means connecting said amplifier to said coil so that said induced voltage is reproduced in amplified form in the output of said amplifier, a free running multivibrator in said unit arranged to develop a square wave output signal and having a time constant determining circuit which controls the ratio of on-off periods of said square wave output signal, means connecting the output of said amplified to said time constant determining circuit, thereby to modulate the ratio of on-off periods of said square wave output signal in accordance with said amplified induced voltage, a constant current source of power at the earth's surface and connected to the upper end of said cable, an impedance in said unit, means including a switching transistor in said unit for connecting said impedance across the bottom end of said cable, means for controlling conduction of said switching transistor in accordance with said modulated square wave output signal, whereby the additional current drawn by said impedance during conduction of said transistor causes the voltage across said cable to vary in proportion to said modulated square wave output signal, said voltage variation being transmitted up said cable to the earth's surface as a casing collar signal, and means at the earth's surface for detecting said casing collar signal and providing an indication of the traversal of casing collars by said subsurface unit.

4. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, a differential amplifier in said unit and having a pair of input terminals, means connecting said coil between said pair of input terminals, said differential amplifier having a pair of output terminals, a balanced multivibrator in said unit arranged to develop a pair of oppositely polarized square wave signals of predetermined periodicity and having a pair of time constant determining circuits, means connecting said output terminals of said differential amplifier to said pair of time constant determining circuits so that the ratio of on-off periods of said pair of square wave signals is modulated in accordance with said induced voltage, means in said unit for impressing a casing collar signal on said cable corresponding to said modulated square wave signals for transmission to the earth's surface, and means at the earth's surface for detecting said casing collar signal and providing an indication of the traversal of casing collars by said subsurface unit.

5. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, a differential amplifier in said unit and having a pair of input terminals, means connecting said coil between said pair of input terminals, said differential amplifier having a pair of output terminals, a balanced multivibrator in said unit arranged to develop a pair of oppositely polarized square wave signals of predetermined periodicity and having a pair of time constant determining circuits, means connecting said output terminals of said differential amplifier to said pair of time constant determining circuits so that the ratio of on-off periods of said pair of square wave signals is modulated in accordance with said induced voltage, a switching transistor in said unit, means for controlling conduction of said transistor in accordance with said oppositely polarized modulated square wave signals, means for impressing a casing collar signal on said cable in accordance with the conduction periods of said transistor, and means at the earth's surface for detecting said casing collar signal and providing an indication of the traversal of casing collars by said subsurface unit.

6. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, a differential amplifier in said unit and having a pair of input terminals, means connecting said coil between said pair of input terminals, said differential amplifier having a pair of output terminals, a balanced multivibrator in said unit arranged to develop a pair of oppositely polarized square wave signals of predetermined periodicity and having a pair of time constant determining circuits, means connecting said output terminals of said differential amplifier to said pair of time constant determining circuits so that the ratio of on-off periods of said pair of square wave signals is modulated in accordance with said induced voltage, a switching transistor in said unit, a biasing diode connected to the emitter circuit of said transistor, means for applying one of said pair of modulated square wave signals to the base of said transistor, and the other of said pair to the emitter of said transistor, thereby controlling conduction of said transistor while providing a balanced load for said multivibrator, means for impressing a casing collar signal on said cable in accordance with the conduction periods of said transistor, and means at the earth's surface for detecting said casing collar signal and providing an indication of the traversal of casing collars by said subsurface unit.

7. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, means in said unit for developing a square wave signal having a predetermined ratio of on-off periods, means for modulating said square wave signal so that the ratio of on-off periods thereof varies in accordance with said induced collar locating voltage, means in said unit for impressing a casing collar signal on said cable corresponding to said modulated square wave signal, a high gain amplifier at the earth's surface and provided with an input circuit, a pair of parallel connected reversely polarized diodes, means for connecting said input circuit of said amplifier to the upper end of said cable, means connecting said diodes in said input circuit in a shunt path to ground so that the amplitude of signals applied to said high gain amplifier is limited to a predetermined maximum value and overloading of said high gain amplifier by large amplitude signals is prevented, and means connected to the output of said high gain amplifier for providing an indication of the traversal of casing collars by said subsurface unit.

8. A casing collar logging system as set forth in claim 7, wherein a capacitor is employed to connect the upper end of said cable to said input circuit and said diodes prevent excessive charging of said capacitor during large amplitude overload signals appearing on said cable.

9. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, means in said unit for developing a square wave signal having a predetermined ratio of on-off periods, means for modulating said square wave signal so that the ratio of on-off periods thereof varies in accordance with said induced collar locating voltage, means in said unit for impressing a casing collar signal on said cable corresponding to said modulated square wave signal, a high gain amplifier at the earth's surface and provided with an input circuit and an output circuit, frequency selective feedback means connected between said output and input circuits so that said amplifier provides selectively greater amplification for signals in the frequency range of said casing collar signal, a pair of parallel connected reversely polarized diodes, means including said diodes for coupling said input circuit of said amplifier to the upper end of said cable, whereby only those portions of said casing collar signal having an amplitude greater than the conduction potential of said diodes are impressed upon said input circuit, and means connected to the output of said high gain amplifier for providing an indication of the traversal of casing collars by said subsurface unit.

10. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, means in said unit for developing a square wave signal having a predetermined ratio of on-off periods, means for modulating said square wave signal so that the ratio of on-off periods thereof varies in accordance with said induced collar locating voltage, means in said unit for impressing a casing collar signal on said cable corresponding to said modulated square wave signal, a high gain amplifier at the earth's surface and provided with an input circuit and an output circuit, a filter network connected between said input and output circuits to provide feedback therebetween so that said amplifier provides selectively greater amplification for signals in the frequency range of said casing collar signal, said filter network including a pair of capacitors, means connecting one of said capacitors to a positive unidirectional voltage and the other of said capacitors to a negative unidirectional voltage so that said capacitors can be charged upon initial energization of said amplifier without overloading said amplifier, a pair of parallel connected reversely polarized diodes, means including said diodes for coupling said input circuit of said amplifier to the upper end of said cable, whereby only those portions of said casing collar signal having an amplitude greater than the conduction potential of said diodes are impressed upon said input circuit, and means connected to the output of said high gain amplifier for providing an indication of the traversal of casing collars by said subsurface unit.

11. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, means in said unit for developing a square wave signal having a predetermined ratio of on-off periods, means for modulating said square wave signal so that the ratio of on-off periods thereof varies in accordance with said induced collar locating voltage, means in said unit for impressing a casing collar signal on said cable corresponding to said modulated square wave signal, a high gain amplifier at the earth's surface and provided with an input circuit and an output circuit, a filter network connected between said input and output circuits to provide feedback therebetween so that said amplifier provides selectively greater amplification for signals in the frequency range of said casing collar signal, said filter network including a pair of capacitors, means connecting one of said capacitors to a positive unidirectional voltage and the other of said capacitors to a negative unidirectional voltage so that said capacitors can be charged upon initial energization of said amplifier without overloading said amplifier, means for coupling said input circuit of said amplifier to the upper end of said cable, and means connected to the output of said high gain amplifier for providing an indication of the traversal of casing collars by said subsurface unit.

12. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, a multivibrator in said unit and arranged to develop a square wave output signal of predetermined periodicity, means for controlling said multivibrator in accordance with said induced collar locating voltage so that the on-off ratio of said square wave output signal varies in accordance with said induced voltage, a constant current source of D.C. power at the earth's surface and connected to the upper end of said cable, an impedance in said unit, a switching device in said unit, means connecting said impedance and said switching device in series across said cable, means for controlling conduction of said switching device in accordance with said modulated square wave output signal, whereby the additional current drawn by said impedance during conduction of said device causes the voltage across said cable to vary, said voltage variation appearing at the earth's surface as a casing collar signal, and means at the earth's surface for detecting said casing collar signal and providing an indication of the traversal of casing collars by said subsurface unit.

13. A casing collar logging system as set forth in claim 12 wherein said switching device is a transistor and means are provided for connecting oppositely polarized outputs from said multivibrator to the base and emitter of said switching transistor, thereby to provide a balanced load on said multivibrator so that the total period of said multivibrator remains substantially constant despite wide variations in temperature.

14. A casing collar logging system as set forth in claim 12, wherein there is provided a rectifier connected between the center conductor of said cable and said multivibrator and said switching device, said rectifier being polarized so that connection of said power source to the upper end of said cable in the wrong polarity renders said rectifier nonconductive and prevents damage to said multivibrator and switching device.

15. A casing collar logging system as set forth in claim 13, wherein a biasing diode is connected to the emitter of said switching transistor and a resistor connecting said diode to one of the outputs of said multivibrator also provides forward biasing current for said diode.

16. In a casing collar logging system, the combination of, a subsurface unit, a cable connected to said unit for moving the same through a bore hole, a collar locator coil in said unit, means for establishing a magnetic field which links said coil and is affected by casing collars as said unit is moved through the bore hole, whereby a voltage is induced in said coil each time said unit passes a casing collar, means in said unit for developing a square wave signal having a predetermined ratio of on-off periods, means for modulating said square wave signal so that the ratio of on-off periods thereof varies in accordance with said induced collar locating voltage, means in said unit for impressing a casing collar signal on said cable corresponding to said modulated square wave signal, a high gain amplifier at the earth's surface and provided with an input circuit connected to the upper end of said cable, a filter network connected between the input and output of said high gain amplifier to provide feedback therebetween, said filter network including a pair of capacitors, and means connecting one of said capacitors to a positive unidirectional voltage and the other of said capacitors to a negative unidirectional voltage so that said capacitors can be charged upon initial energization of said amplifier without overloading said amplifier.

References Cited

UNITED STATES PATENTS

| | | | |
|---|---|---|---|
| 2,974,303 | 3/1961 | Dixon | 340—18 |
| 3,079,549 | 2/1963 | Martin | 340—18 |
| 3,116,448 | 12/1963 | Vogel | 324—1 |
| 3,150,321 | 9/1964 | Summers | 340—18 |

RUDOLPH V. ROLINEC, *Primary Examiner.*

R. J. CORCORAN, *Assistant Examiner.*

U.S. Cl. X.R.

324—1; 340—18, 177